(12) United States Patent
Kreulen et al.

(10) Patent No.: US 6,424,971 B1
(45) Date of Patent: Jul. 23, 2002

(54) SYSTEM AND METHOD FOR INTERACTIVE CLASSIFICATION AND ANALYSIS OF DATA

(75) Inventors: Jeffrey Thomas Kreulen; Dharmendra Shantilal Modha, both of San Jose; William Scott Spangler, San Martin; Hovey Raymond Strong, Jr., San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,650

(22) Filed: Oct. 29, 1999

(51) Int. Cl.⁷ .............................................. G06F 17/30
(52) U.S. Cl. .............................. 707/7; 707/101; 707/6; 707/4
(58) Field of Search ................................. 707/7, 6, 2, 4, 707/101, 3, 5; 345/440, 427; 704/9, 2, 8; 382/225, 224, 228; 714/26, 47; 706/16

(56) References Cited

U.S. PATENT DOCUMENTS

| | | | |
|---|---|---|---|
| 5,483,637 A | | 1/1996 | Winokur et al. ............... 714/26 |
| 5,600,791 A | | 2/1997 | Carlson et al. ............... 714/47 |
| 5,703,964 A | | 12/1997 | Menon et al. ............... 382/228 |
| 5,822,741 A | | 10/1998 | Fischthal ....................... 706/16 |
| 5,857,179 A | * | 1/1999 | Vaithyanathan et al. ........ 707/2 |
| 5,864,855 A | * | 1/1999 | Ruocco et al. ................. 707/10 |
| 6,100,901 A | * | 8/2000 | Mohda et al. ............... 345/440 |
| 6,137,911 A | * | 10/2000 | Zhilyeav ...................... 382/225 |
| 6,269,376 B1 | * | 7/2001 | Dhillon et al. ............... 707/101 |

* cited by examiner

Primary Examiner—Sanjiv Shah
(74) Attorney, Agent, or Firm—Morgan & Finnegan; Khanh Q. Tran

(57) ABSTRACT

A system, method, and computer program product for interactively classifying and analyzing data is particularly applicable to classification and analysis of textual data. It is particularly useful in identification of helpdesk inquiry and problem categories amenable to automated fulfillment or solution. A dictionary is generated based on a frequency of occurrence of words in a document set. A count of occurrences of each word in the dictionary within each document in the document set is generated. The set of documents is partitioned into a plurality of clusters. A name, a centroid, a cohesion score, and a distinctness score are generated for each cluster and displayed in a table. The documents contained in the clusters sorted based on their similarity to other documents in the cluster. The similarity may be determined by calculating the distance of the document to the centroid of the cluster and the documents may be sorted in order of ascending or descending distance of the document to the centroid of the cluster. Editing input may be received from a user and the displayed table modified based on the received editing input—clusters may be split or deleted. The helpdesk application area is only one of many areas to which the present invention may be advantageously applied. One of ordinary skill in the art would recognize that any set of text documents may be classified and subsequently analyzed using the present invention.

48 Claims, 8 Drawing Sheets

```
public String nameCluster(KMeans k, int c) {
    Vector v = k.getCluster(c);
    boolean usedPoints[] = new boolean[v.size()];
    String result = "";
    int maxWords 5; // a name can have at most this many words
    int threshold = 10; // a word must occur in at least this many documents
    int w = 0;
  int pos = 0;

while (w<maxWords && !allTrue(usedPoints)) {
   float counts[] = new float[ k.input_length];
        for (int i=0; i<v.size(); i++) {
            if (usedPoints[i]) continue;
            SparseMatrixRow smr = (SparseMatrixRow)v.elementAt(i);
            for (intj=0; j<smr.positions.length; j++)
                    counts[smr.positions[j]]++;
  }
    pos = Util.maxPosition(counts); // the most frequently occurring word
    if (counts[pos]<threshold) break;
        if (!result.equals("")) {
        result = result + ",";
        }
    result = result + k.dictionary[pos];
        for (int i=0; i<v.size(); i++) {
            SparseMatrixRow smr =
            (SparseMatrixRow)v.elementAt(i);
           if (smr.getData(pos)>0) usedPoints[i]=true;
  }
    w++;
}
return(result);
}
```

| CLUSTER NAME | SIZE | COH. | DIST. |
|---|---|---|---|
| ACCESS | 361 | 295 | 140 |
| ACCOUNT | 519 | 356 | 64 |
| APR | 61 | 329 | 211 |
| COORD | 364 | 278 | 7 |
| DECOMMISSION,TRANSFERRED,COMPAQ | 151 | 249 | 196 |
| DESK,STATUS,STATED,HELP | 196 | 233 | 260 |
| DRIVE | 413 | 316 | 196 |
| ERROR,REBOOT | 273 | 234 | 134 |
| EXCHANGE | 406 | 293 | 64 |
| FILE | 442 | 303 | 109 |
| HUNG,WRONG | 110 | 329 | 44 |
| INSTALLED | 320 | 256 | 55 |
| INTERNET | 247 | 407 | 150 |
| LAPTOP | 227 | 263 | 136 |
| MACHINE,VIRUS | 289 | 233 | 119 |
| MAIL,ADDRESS | 231 | 219 | 86 |
| MIGRATED,WORD,ICON,TOLD,ADDED | 181 | 151 | 254 |
| MONITOR,PROCUREMENT | 148 | 300 | 196 |
| NARF,RECEIVED | 159 | 357 | 122 |
| NETWORK | 357 | 256 | 134 |
| PASSWORD | 1139 | 363 | 226 |
| PERSONNEL,SPEAK,SERVICE | 119 | 260 | 313 |
| PHONE,LIST | 205 | 254 | 204 |
| PRINT | 966 | 374 | 174 |
| QUEUE,LINE | 119 | 309 | 277 |
| QUOTE,PROJECT | 749 | 332 | 213 |
| RPR,ISSUE | 461 | 239 | 0 |
| SCHEDULE,OPENED | 162 | 207 | 109 |
| SERVER | 224 | 251 | 44 |
| SPACE,ISSUES,INCREASED | 425 | 216 | 196 |
| SUPPORT,SUBJECT | 326 | 247 | 0 |
| WIN31 | 388 | 418 | 290 |
| WIN95 | 1134 | 421 | 114 |
| WORK,MOVING | 127 | 237 | 207 |
| WORKING,SYSTEM,FINE,OMNI | 299 | 215 | 110 |

SYSTEM AND METHOD FOR INTERACTIVE CLASSIFICATION AND ANALYSIS OF DATA

FIELD OF THE INVENTION

The present invention relates to system and method for interactively classifying and analyzing data, and is particularly applicable to classification and analysis of textual data.

BACKGROUND OF THE INVENTION

It is becoming increasingly common for organizations to provide a helpdesk service to their customers. Typically, a customer will call the helpdesk to ask for information and to seek solutions to problems relating to the operation of products, the performance of services, necessary procedures and forms, etc. Typically, helpdesks are staffed by knowledgeable human operators, who often spend considerable time with each caller in order to answer the caller's questions. As a result, helpdesk operation is very expensive and manpower intensive. Much of the helpdesk operator's time is spent solving identical or nearly identical problems over and over again. A need arises for a technique by which the solutions to frequently recurring problems may be automated in order to improve the efficiency of helpdesk operation. In particular, what is needed is a technique that can aid in identification of helpdesk inquiry and problem categories that are most amenable to automated fulfillment or solution.

SUMMARY OF THE INVENTION

The present invention relates to system and method for interactively classifying and analyzing data that is particularly applicable to classification and analysis of textual data. The present invention is useful in a variety of situations, and is particularly advantageous in aiding in identification of helpdesk inquiry and problem categories that are most amenable to automated fulfillment or solution.

The present invention is useful in identifying candidate helpdesk problem categories that are most amenable to automated solutions. In a preferred embodiment, the present invention uses clustering techniques to identify collections of problems from free form text descriptions. It then facilitates a human user's modifications to collections as appropriate to improve the coherence and usefulness of the classification. Measures of cluster goodness, such as intra-cluster cohesion and inter-cluster distinctness are used to help the user determine which classes are the best candidates for automated solutions. Clusters are named automatically to convey some idea of their contents. Documents within each cluster may be viewed in sorted order by typicality. Ultimately, the user may use all of this information in combination to interactively modify the text categories to produce a classification that will be useful in authoring solutions.

The helpdesk application area is only one of many areas to which the present invention may be advantageously applied. One of ordinary skill in the art would recognize that any set of text documents may be classified and subsequently analyzed using the present invention.

The present invention is a method, system, and computer program product for interactive classification and analysis. In order to carry out the method, a dictionary is generated including a subset of words contained in a document set based on a frequency of occurrence of each word in the document set. A count of occurrences of each word in the dictionary within each document in the document set is generated. The set of documents is partitioned into a plurality of clusters, each cluster containing at least one document. A name is generated for each cluster. A centroid of each cluster in the space of the dictionary is generated. A cohesion score is generated for each cluster. A distinctness score is generated for each cluster. A table including the name of each cluster and the cohesion score and distinctness score for each cluster is displayed.

Further, for at least one cluster, the documents contained in at least one cluster, are displayed and the documents sorted based on their similarity to other documents in the cluster. The similarity of a document to other documents may be determined by calculating the distance of the document to the centroid of the cluster. The documents may be sorted in order of descending distance of the document to the centroid of the cluster or the documents may be sorted in order of ascending distance of the document to the centroid of the cluster.

Further, editing input may be received from a user and the displayed table modified based on the received editing input. The editing input may comprise an indication of a cluster to be split, in which case the displayed table is modified by splitting the indicated cluster. The editing input may comprise an indication of a cluster to be deleted, in which case the displayed table is modified by deleting the indicated cluster.

The count may be generated by generating a matrix having rows and columns, each column corresponding to a word in the dictionary, each row corresponding to a document, and each entry representing a number of occurrences of the corresponding word in the corresponding document.

The set of documents may be partitioned by partitioning the set of documents into a plurality of clusters using a k-means partitioning procedure. The k-means partitioning procedure may include determining a distance between a centroid and a document vector using a distance function of:

$$d(X, Y) = -\frac{X \cdot Y}{\|X\| \cdot \|Y\|},$$

wherein X is the centroid, Y is the document vector, and d(X,Y) is the distance between the centroid and the document vector.

A name may be generated for each cluster by, for each cluster, including in the name of the cluster at least one word, the word selected from the dictionary based on a frequency of occurrence in the cluster. Likewise, a name may be generated for each cluster by, for each cluster, including in the name of the cluster a plurality of words, each word selected from the dictionary based on a frequency of occurrence in the cluster.

The centroid may be generated by generating a vector having a plurality of entries, each entry corresponding to a word in the common dictionary and having a value equal to an average of the values of the entries in the matrix corresponding to the word in the common dictionary.

The cohesion score for each cluster may be generated by generating a cohesion score based on an average negative cosine distance of the centroid of the cluster to the documents contained in the cluster. The distinctness score for each cluster may be generated by generating a cohesion score based on an average negative distance of the centroid of the cluster to a closest centroid among centroids of other clusters.

The displayed table may be user-editable and the user may be provided with the capability to delete and split clusters.

BRIEF DESCRIPTION OF THE DRAWINGS

The details of the present invention, both as to its structure and operation, can best be understood by referring to the accompanying drawings, in which like reference numbers and designations refer to like elements.

FIG. 6 is an exemplary code listing of a code fragment that implements one step in the process shown in FIG. 4.

FIG. 7 is an exemplary format of a cluster quality/relation table generated according to present invention.

DETAILED DESCRIPTION OF THE INVENTION

Figure 1:
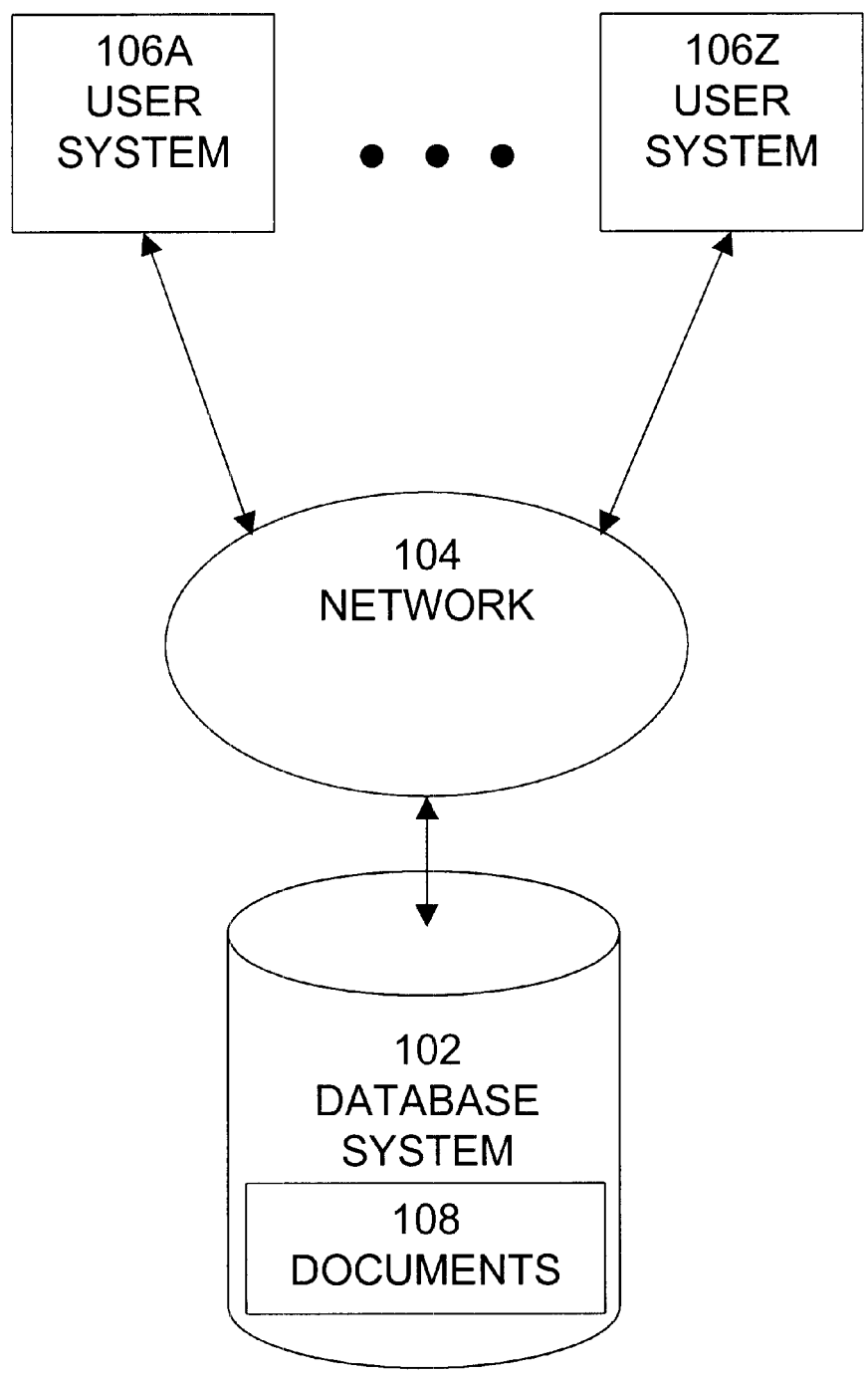
FIG. 1 is an exemplary block diagram of a networked database system in which the present invention may be implemented.

An exemplary networked database system is shown in FIG. 1. The system includes database system 102, network 104, and a plurality of user systems 106A–Z. The user systems 106A–Z are communicatively connected to database system 102 by network 104. The user systems 106A–Z may obtain data from database system 102 by transmitting queries to database system 102, which performs the query by accessing data that satisfies the query, and transmits the data to the requesting user system. Many types of data may be stored in database system 102, but the present invention is concerned with data in the form of documents 108 that contain textual information, such as email messages, categorizations of help desk problem tickets, and logical groupings of research abstracts by subject. The present invention is particularly advantageous when applied to documents including information relating to answers and solutions to helpdesk inquiries and problems.

Figure 2:
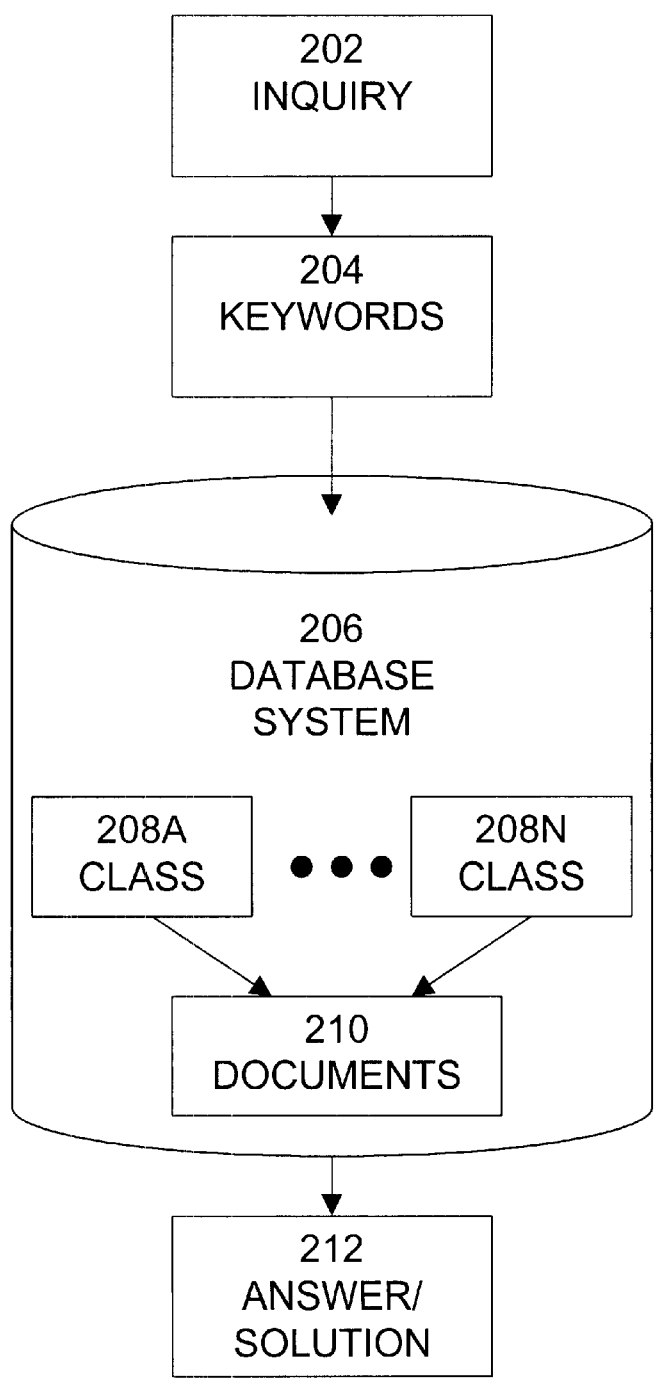
FIG. 2 is an exemplary implementation of the operation of a helpdesk, in which the present invention may be useful.

Documents that are relevant to a particular point may be located by a variety of methods. In the context of providing helpdesk responses, a useful technique is shown in FIG. 2. An inquiry 202, such as a question about or problem with operation of products, the performance of services, necessary procedures and forms, etc. is received by the helpdesk operator. Keywords 204 are extracted from the inquiry and input into database system 206. The keywords may be extracted by the operator and entered into the database system. Alternatively, the entire inquiry may be entered and the keywords automatically extracted. Database system 206 uses the input keywords to select one or more classes 208A–N, which relate to documents 210. Documents 202 are grouped into the plurality of classes 208A–N according to particular criteria. In the context of a helpdesk, the criteria are typically to classify together documents which are likely to provide answers or solutions to similar helpdesk inquiries. For the purposes of the present invention a class is defined accurately by enumeration or listing of the set of documents the class contains. A class will also be described generally be a short phrase or set of words that are most indicative of the set of documents that class comprises. This phrase or set of words is termed a class name. Database system 206 selects one or more classes based on the input keywords. The selected class or classes then define a set of documents, which ideally provide the answer/solution 212 to the inquiry.

Classes 208A–N may be generated manually by a human user, who is typically an expert in the subject matter of the documents. Manual class generation is time-consuming and expensive. The present invention is a system and method for interactive classification and analysis of textual data, which automates much of the process of generating the classes, and thus provides savings in both time and expense. The person who operates the present invention in order to interactively classify and analyze textual data is termed the user of the present invention, while the person who uses the resulting classification and analysis in order to operate a system such as a helpdesk is termed the operator of the helpdesk or other system.

Figure 3:
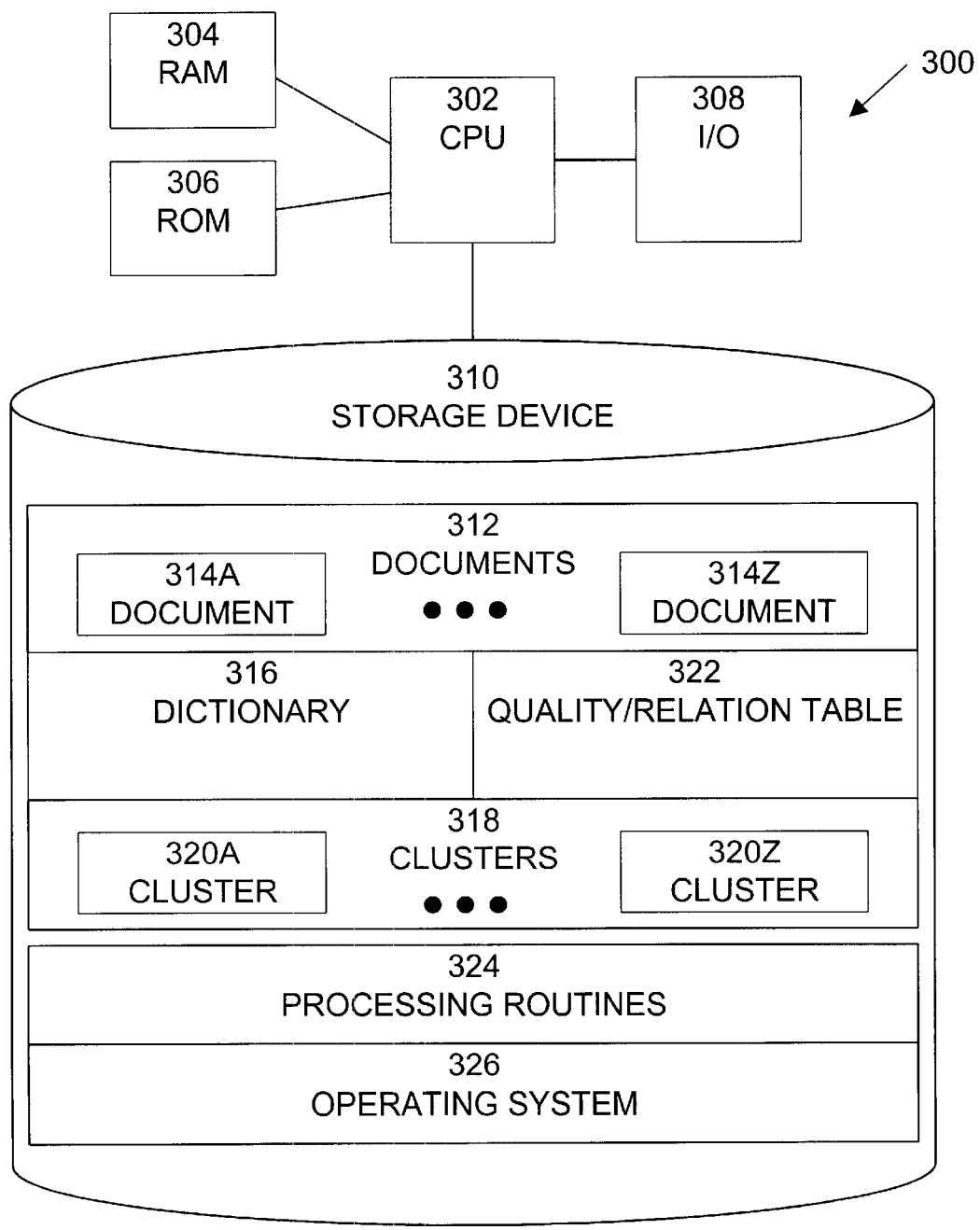
FIG. 3 is an exemplary block diagram of a computer system in which the present invention may be implemented.

An exemplary system 300 in which the present invention may be implemented is shown in FIG. 3. System 300 includes central processing unit (CPU) 302, which is connected to random access memory (RAM) 304, read-only memory (ROM) 306, input/output devices (I/O) 308 and storage device 310. CPU 302 may comprise a microprocessor, for example, an INTEL PENTIUM processor, or CPU 302 may comprise a mini-computer or mainframe processor. RAM 304 and ROM 306 store program instructions that are executed by CPU 302 and data that is used during program execution. I/O devices 308 may include any devices used to input data to system 300, such as a keyboard, mouse, trackpad, trackball and graphics tablet, to output data from system 300, such as a display and a printer, and to both input and output data, such as a modem and a network adapter. Storage device 310, which stores data that is used by the present invention, may comprise, for example, random-access memory, a magnetic disk and/or optical disk and may also comprise a magnetic tape.

Storage device 310 includes documents storage 312, which includes one or more documents 314A–Z. Each document is typically stored as one or more files. Each document typically contains at least some text, but may also contain other types of information, such as numeric data, graphics, images, audio, or video. Dictionary 316 includes a subset of the words contained in document set 312. Cluster storage 318 includes a plurality of clusters, such as clusters 320A–Z. A cluster is a grouping of documents in the set of documents 314A–Z, in which one or more words corresponding to the cluster occur. Clusters are partitioned from among all of the documents relating to document set 314A–Z. Cluster quality/relation table 322 includes a cohesion score, distinctness score and size for each cluster and allows the user to see quickly which clusters have the best/worst quality, and how the clusters relate to each other.

Figure 4:
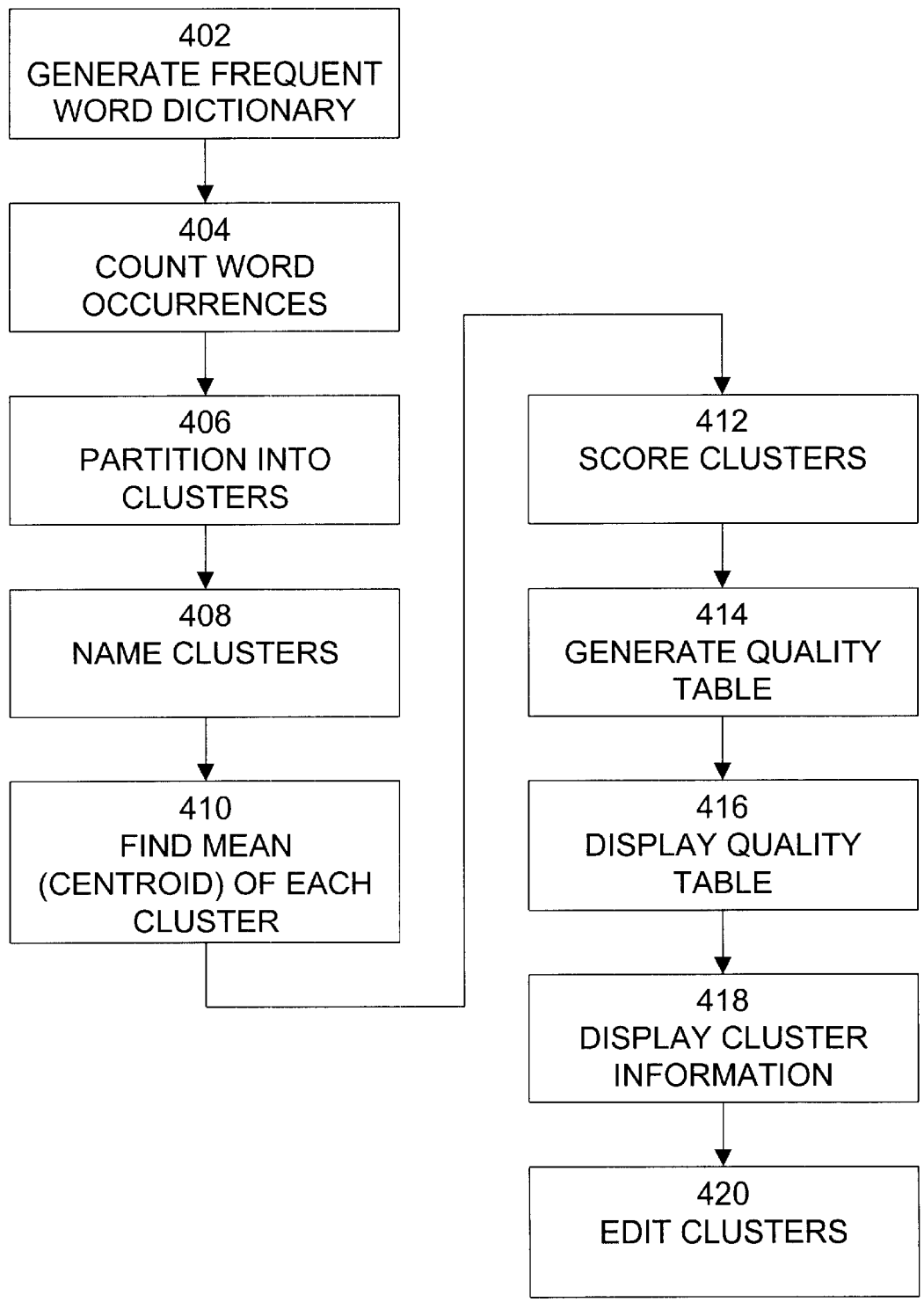
FIG. 4 is an exemplary flow diagram of a process of operation of the present invention.

Storage device 310 includes processing routines 324 include program software routines that are executed by CPU 302 and which implement the processes of the present invention, as described in FIG. 4. Processing routines 324 are preferably written in a high-level programming language, such as the JAVA programming language. If written in JAVA, processing routines 324 run on top of the JAVA virtual machine (not shown). Storage device 310 also includes operating system 326.

Figure 5:
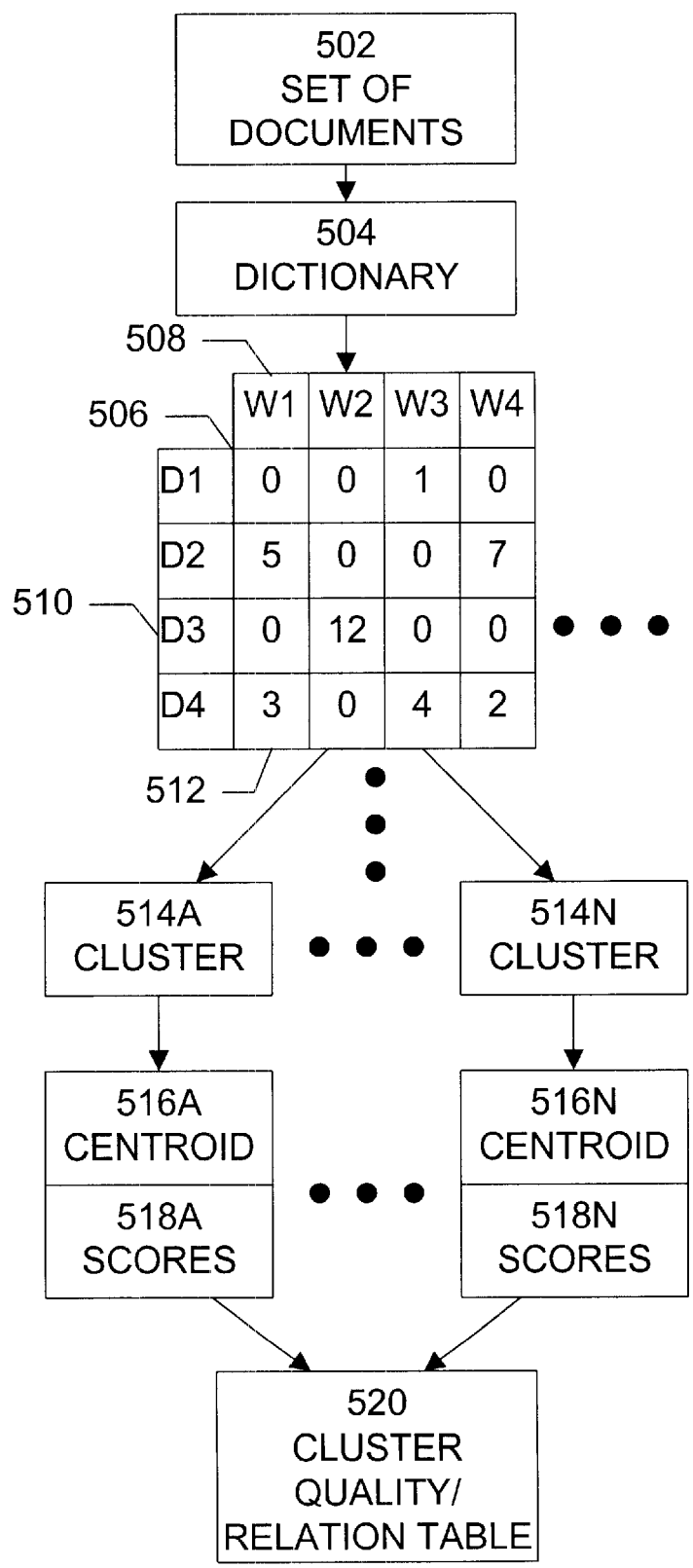
FIG. 5 is an exemplary data flow diagram showing the processing performed by the process shown in FIG. 4.

A process of operation of the present invention is shown in FIG. 4. FIG. 4 is best viewed in conjunction with FIG. 5, which is a data flow diagram showing the processing of information in the present invention. As shown in FIG. 5, there is a set of documents 502. Each document may be wholly or partially made up of text. In step 402 of FIG. 4, a dictionary 504 of frequently used words contained in the set of documents 504 is generated by identifying each word in the text of document set 502 and counting the number of documents in which each word occurs. The most frequently occurring words are used to form dictionary 504.

In step 404 of FIG. 4, occurrences of words in common dictionary 504 are counted, resulting in the creation of matrix 506, shown in FIG. 5. In matrix 506, each column, such as column 508, corresponds to a word in the dictionary and each row, such as row 510, corresponds to a document in the document set 504. Each entry, such as entry 512, in matrix 506 represents the number of times each dictionary word occurs in each document. Since most of these entries will, under normal circumstances, have a value of zero, the matrix is termed "sparse". In a preferred embodiment, this property of sparseness may be used by a compression scheme to greatly decrease the amount of storage required to hold the matrix in memory, while incurring only a small cost in retrieval speed.

In step 406 of FIG. 4, the documents are partitioned into clusters, such as clusters 514A–N of FIG. 5, using a well-known partitioning technique. In a preferred embodiment, the well-known "k-means" procedure is used. The k-means procedure, where "k" is the number of clusters produced, provides automatic classification of data when no classification is known. Preferably, a k-means procedure is implemented using a cosine distance metric to determine the distance (d) between a centroid (X) and a document vector (Y):

$$d(X, Y) = -\frac{X \cdot Y}{\|X\| \cdot \|Y\|}.$$

The number of clusters to produce, k, in an input to the procedure. This input may be provided by the user, or it may be generated based on the size of the document set or dictionary.

In step 410 of FIG. 4, each cluster 514A–N is given a name. In order for a human user to make sense of a cluster, it is valuable to give meaningful names to each cluster. An exemplary code fragment implementing a cluster-naming procedure is shown in FIG. 6.

For a given cluster, this procedure first finds the word from the dictionary that occurs most frequently in that cluster. This word becomes the first word in the name. In the next iteration, only those words that do not contain the most common word in the cluster are considered. Again, the most common word in this set of documents is chosen and added to the name of the cluster. The process continues until the number of words in the name of the cluster reaches a predefined maximum number, or until the number of documents matching the current most common word is less than a predefined threshold.

In step 410 of FIG. 4, the mean or centroid of each cluster in the space of the dictionary is found. For example, in FIG. 5, centroid 516A is found for cluster 514A and centroid 516N is found for cluster 514N. The centroid of each cluster is a vector having the same length as the number of words in the dictionary 504. The value of each entry in the vector is the average value of that entry for all the documents in the cluster. The centroid is therefore, just the mean of the cluster. In a preferred embodiment, the mean of each cluster is actually found as part of the k-means partitioning, and is simply saved for later use.

In step 412 of FIG. 4, a cohesion score and a distinctness score are generated for each cluster. Preferably, the cohesion score is the average negative cosine distance of a cluster centroid to all the documents contained in the cluster. The raw cohesion score is calculated and then refined as a percentage of the sum of all the raw cohesion scores for all the clusters. The distinctness score is the average negative distance of the cluster centroid to the closest centroid among the centroids of the other clusters. The raw distinctness score is calculated and then refined by subtracting it from the maximum distinctness score and expressing the difference as a percentage of the sum of all the raw distinctness scores subtracted from the maximum distinctness for all the clusters.

In step 414, a cluster quality/relation table 520 in FIG. 5 is generated. An example of a cluster quality/relation table is the exemplary table 700 shown in FIG. 7. Table 700 shows the cohesion score, distinctness score, and size for each cluster. In step 416, table 700 is displayed, preferably in a spreadsheet format, which allows user to easily sort the table by any column. This allows the user to see quickly which clusters have the best/worst quality, and how the clusters relate to each other.

Figure 8:
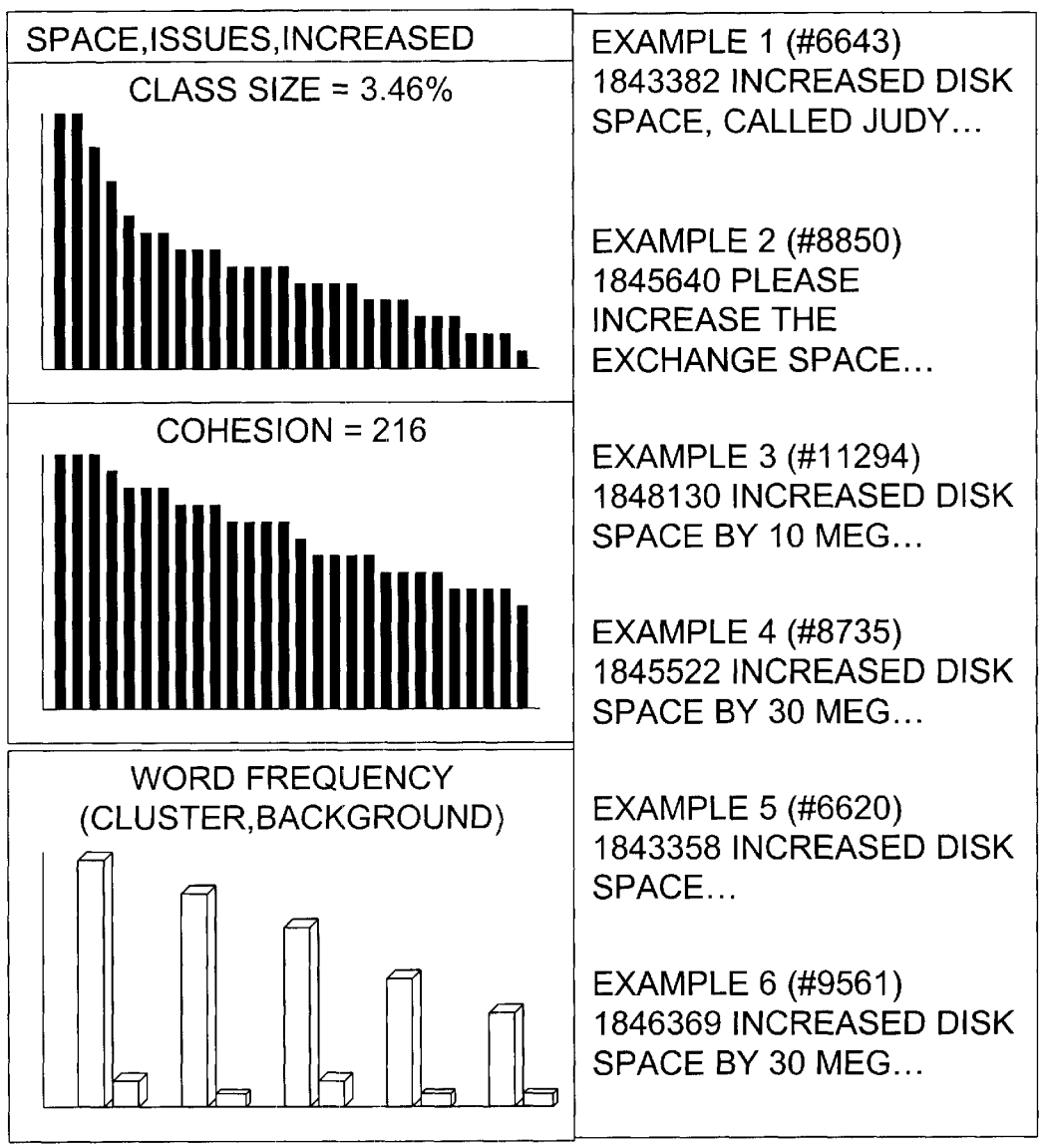
FIG. 8 is an exemplary format of additional useful information that may be displayed, according to present invention.

In step 418, information relating to individual clusters is displayed, as shown in FIG. 8. Preferably, such a display is created using sorted bar charts to indicate the cluster's relationship to other clusters along with the numerical measures previously defined. A bar graph indicating the statistical frequency of dictionary words in the cluster is preferably also displayed. Preferably, the documents may be sorted at the user's discretion according to the similarity of the document to the cluster centroid.

A particularly advantageous aspect of the present invention is the inclusion in the cluster information display of individual documents in the cluster. The documents are sorted based on their similarity to the other documents in the cluster, or to a "typical" document in the cluster. This is determined by calculating the distance of each document in the cluster to the centroid of the cluster. Documents may be sorted in order of descending distance—causing the more typical documents to be displayed first, or documents may be sorted in order of ascending distance—causing the less typical documents to be displayed first. This allows the user determine the content of the documents in the cluster without having to look at all of the documents in order to do so. This saves the user considerable time, and ultimately reduces expenses.

It is important to note that while the documents shown in FIG. 8 are helpdesk problem reports, labeled as examples in the figure, the present invention is equally applicable to other types of documents as well.

In step 418, the user may edit the clusters based on the information displayed in the cluster quality/relation table and the information relating to individual clusters. In particular, a user may input an indication of a cluster to be split and the displayed table is modified by splitting the indicated cluster, or the user may input an indication of a cluster to be deleted and the displayed table is modified by deleting the indicated cluster.

Preferably, a cluster may be deleted or split based on the cluster's cohesion and distinctness scores, as well as the user's review of the documents contained in the cluster. In general, clusters with low cohesion scores are candidates to be split into multiple clusters. Clusters with low distinctness scores are candidates to be deleted. When a cluster is deleted, its documents are placed into the next nearest cluster and all of the centroids are recalculated. When a cluster is split, the k-means partitioning procedure is performed on the set of documents contained in the cluster. A visual plot of the resulting sub-clustering, including centroids and their spatial relationship to the cluster documents may be displayed.

If the user chooses to retain the new centroids, they are then rolled back up into the primary clustering and each document point is reevaluated to determined which of the clusters it belongs to.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for interactive classification and analysis comprising the steps of:
    generating a dictionary including a subset of words contained in a document set based on a frequency of occurrence of each word in the document set;
    generating a count of occurrences of each word in the dictionary within each document in the document set;
    partitioning the set of documents into a plurality of clusters, each cluster containing at least one document;
    generating a name for each cluster;
    generating a centroid of each cluster in the space of the dictionary;
    generating a cohesion score for each cluster;
    generating a distinctness score for each cluster; and
    displaying a table including the name of each cluster and the cohesion score and distinctness score for each cluster.

2. The method of claim 1, further comprising the step of:
    displaying, for at least one cluster, the documents contained in the at least one cluster, the documents sorted based on their similarity to other documents in the cluster.

3. The method of claim 2, wherein the similarity of a document to other documents is determined by calculating the distance of the document to the centroid of the cluster.

4. The method of claim 3, wherein the documents are sorted in order of descending distance of the document to the centroid of the cluster.

5. The method of claim 3, wherein the documents are sorted in order of ascending distance of the document to the centroid of the cluster.

6. The method of claim 2, further comprising the steps of:
    receiving editing input from a user; and
    modifying the displayed table based on the received editing input.

7. The method of claim 6, wherein the editing input comprises an indication of a cluster to be split and the displayed table is modified by splitting the indicated cluster.

8. The method of claim 6, wherein the editing input comprises an indication of a cluster to be deleted and the displayed table is modified by deleting the indicated cluster.

9. The method of claim 6, wherein the count generating step comprises the step of:
    generating a matrix having rows and columns, each column corresponding to a word in the dictionary, each row corresponding to a document, and each entry representing a number of occurrences of the corresponding word in the corresponding document.

10. The method of claim 9, wherein the partitioning step comprises the step of:
    partitioning the set of documents into a plurality of clusters using a k-means partitioning procedure.

11. The method of claim 10, wherein the k-means partitioning procedure comprises the step of:
    determining a distance between a centroid and a document vector using a distance function of:

$$d(X, Y) = -\frac{X \cdot Y}{\|X\| \cdot \|Y\|},$$

wherein X is the centroid, Y is the document vector, and d(X,Y) is the distance between the centroid and the document vector.

12. The method of claim 9, wherein the step of generating a name for each cluster comprises the step of:
    for each cluster, including in the name of the cluster at least one word, the word selected from the dictionary based on a frequency of occurrence in the cluster.

13. The method of claim 9, wherein the step of generating a name for each cluster comprises the step of:
    for each cluster, including in the name of the cluster a plurality of words, each word selected from the dictionary based on a frequency of occurrence in the cluster.

14. The method of claim 9, wherein the centroid generating step comprises the step of:
    generating a vector having a plurality of entries, each entry corresponding to a word in the common dictionary and having a value equal to an average of the values of the entries in the matrix corresponding to the word in the common dictionary.

15. The method of claim 14, wherein the step of generating a cohesion score for each cluster comprises the step of:
    generating a cohesion score based on an average negative cosine distance of the centroid of the cluster to the documents contained in the cluster.

16. The method of claim 15, wherein the step of generating a distinctness score for each cluster comprises the step of:
    generating a cohesion score based on an average negative distance of the centroid of the cluster to a closest centroid among centroids of other clusters.

17. The system of claim 16, wherein the means for sorting the documents based on their similarity to other documents in the cluster comprises means for calculating the distance of the document to the centroid of the cluster.

18. The system of claim 17, wherein the sorting means further comprises means for sorting the documents in order of descending distance of the document to the centroid of the cluster.

19. The system of claim 17, wherein the sorting means further comprises means for sorting the documents in order of ascending distance of the document to the centroid of the cluster.

20. A system for interactive classification and analysis comprising:
   means for generating a dictionary including a subset of words contained in a document set based on a frequency of occurrence of each word in the document set;
   means for generating a count of occurrences of each word in the dictionary within each document in the document set;
   means for partitioning the set of documents into a plurality of clusters, each cluster containing at least one document;
   means for generating a name for each cluster;
   means for generating a centroid of each cluster in the space of the dictionary;
   means for generating a cohesion score for each cluster;
   means for generating a distinctness score for each cluster; and
   means for displaying a table including the name of each cluster and the cohesion score and distinctness score for each cluster.

21. The system of claim 20, further comprising:
   means for displaying, for at least one cluster, the documents contained in the at least one cluster, comprising means for sorting the documents based on their similarity to other documents in the cluster.

22. The system of claim 21, further comprising:
   means for receiving editing input from a user; and
   means for modifying the displayed table based on the received editing input.

23. The system of claim 22, wherein the editing input comprises an indication of a cluster to be split and the displayed table is modified by splitting the indicated cluster.

24. The system of claim 22, wherein the editing input comprises an indication of a cluster to be deleted and the displayed table is modified by deleting the indicated cluster.

25. The system of claim 22, wherein the count generating means comprises:
   generating a matrix having rows and columns, each column corresponding to a word in the dictionary, each row corresponding to a document, and each entry representing a number of occurrences of the corresponding word in the corresponding document.

26. The system of claim 25, wherein the partitioning means comprises:
   means for partitioning the set of documents into a plurality of clusters using a k-means partitioning procedure.

27. The system of claim 26, wherein the k-means partitioning means comprises:
   means for determining a distance between a centroid and a document vector using a distance function of:

$$d(X, Y) = -\frac{X \cdot Y}{\|X\| \cdot \|Y\|},$$

wherein X is the centroid, Y is the document vector, and d(X,Y) is the distance between the centroid and the document vector.

28. The system of claim 26, wherein the means for generating a name for each cluster comprises:
   means for, for each cluster, including in the name of the cluster at least one word, the word selected from the dictionary based on a frequency of occurrence in the cluster.

29. The system of claim 26, wherein the means for generating a name for each cluster comprises:
   means for, for each cluster, including in the name of the cluster a plurality of words, each word selected from the dictionary based on a frequency of occurrence in the cluster.

30. The system of claim 26, wherein the centroid generating means comprises:
   means for generating a vector having a plurality of entries, each entry corresponding to a word in the common dictionary and having a value equal to an average of the values of the entries in the matrix corresponding to the word in the common dictionary.

31. The system of claim 30, wherein the means for generating a cohesion score for each cluster comprises:
   means for generating a cohesion score based on an average negative cosine distance of the centroid of the cluster to the documents contained in the cluster.

32. The system of claim 31, wherein the means for generating a distinctness score for each cluster comprises:
   means for generating a cohesion score based on an average negative distance of the centroid of the cluster to a closest centroid among centroids of other clusters.

33. A computer program product for interactive classification and analysis, comprising:
   a computer readable medium;
   computer program instructions, recorded on the computer readable medium, executable by a processor, for performing the steps of:
      generating a dictionary including a subset of words contained in a document set based on a frequency of occurrence of each word in the document set;
      generating a count of occurrences of each word in the dictionary within each document in the document set;
      partitioning the set of documents into a plurality of clusters, each cluster containing at least one document;
      generating a name for each cluster;
      generating a centroid of each cluster in the space of the dictionary;
      generating a cohesion score for each cluster;
      generating a distinctness score for each cluster; and
      displaying a table including the name of each cluster and the cohesion score and distinctness score for each cluster.

34. The computer program product of claim 33, wherein the computer program instructions further comprise instructions for performing the step of:
   displaying, for at least one cluster, the documents contained in the at least one cluster, the documents sorted based on their similarity to other documents in the cluster.

35. The computer program product of claim 34, wherein the similarity of a document to other documents is determined by calculating the distance of the document to the centroid of the cluster.

36. The computer program product of claim 35, wherein the documents are sorted in order of descending distance of the document to the centroid of the cluster.

37. The computer program product of claim 35, wherein the documents are sorted in order of ascending distance of the document to the centroid of the cluster.

38. The computer program product of claim 34, wherein the computer program instructions further comprise instructions for performing the steps of:

receiving editing input from a user; and modifying the displayed table based on the received editing input.

39. The computer program product of claim 38, wherein the editing input comprises an indication of a cluster to be split and the displayed table is modified by splitting the indicated cluster.

40. The computer program product of claim 38, wherein the editing input comprises an indication of a cluster to be deleted and the displayed table is modified by deleting the indicated cluster.

41. The computer program product of claim 38, wherein the count generating step comprises the step of:

generating a matrix having rows and columns, each column corresponding to a word in the dictionary, each row corresponding to a document, and each entry representing a number of occurrences of the corresponding word in the corresponding document.

42. The computer program product of claim 41, wherein the partitioning step comprises the step of:

partitioning the set of documents into a plurality of clusters using a k-means partitioning procedure.

43. The computer program product of claim 42, wherein the k-means partitioning procedure comprises the step of:

determining a distance between a centroid and a document vector using a distance function of:

$$d(X, Y) = -\frac{X \cdot Y}{\|X\| \cdot \|Y\|},$$

wherein X is the centroid, Y is the document vector, and d(X,Y) is the distance between the centroid and the document vector.

44. The computer program product of claim 41, wherein the step of generating a name for each cluster comprises the step of:

for each cluster, including in the name of the cluster at least one word, the word selected from the dictionary based on a frequency of occurrence in the cluster.

45. The computer program product of claim 41, wherein the step of generating a name for each cluster comprises the step of:

for each cluster, including in the name of the cluster a plurality of words, each word selected from the dictionary based on a frequency of occurrence in the cluster.

46. The computer program product of claim 41, wherein the centroid generating step comprises the step of:

generating a vector having a plurality of entries, each entry corresponding to a word in the common dictionary and having a value equal to an average of the values of the entries in the matrix corresponding to the word in the common dictionary.

47. The computer program product of claim 46, wherein the step of generating a cohesion score for each cluster comprises the step of:

generating a cohesion score based on an average negative cosine distance of the centroid of the cluster to the documents contained in the cluster.

48. The computer program product of claim 47, wherein the step of generating a distinctness score for each cluster comprises the step of:

generating a cohesion score based on an average negative distance of the centroid of the cluster to a closest centroid among centroids of other clusters.

* * * * *